US006886059B2

(12) United States Patent
Smith et al.

(10) Patent No.: US 6,886,059 B2
(45) Date of Patent: Apr. 26, 2005

(54) METHODS AND STRUCTURE FOR SCSI/IDE TRANSLATION FOR NON-SCSI ENCLOSURES IN A STORAGE SUBSYSTEM

(75) Inventors: Gerald Edward Smith, Suwanee, GA (US); Loyola Pitchai, Norcross, GA (US)

(73) Assignee: LSI Logic Corporation, Milpitas, CA (US)

( * ) Notice: Subject to any disclaimer, the term of this patent is extended or adjusted under 35 U.S.C. 154(b) by 57 days.

(21) Appl. No.: 10/285,149

(22) Filed: Oct. 31, 2002

(65) Prior Publication Data

US 2004/0088455 A1 May 6, 2004

(51) Int. Cl.[7] ............................................. G06F 13/12
(52) U.S. Cl. ............................ 710/72; 710/74; 710/14
(58) Field of Search ............................... 710/301–304, 710/8, 10, 14, 15–19, 32, 72–74

(56) References Cited

U.S. PATENT DOCUMENTS

| | | | | |
|---|---|---|---|---|
| 5,809,285 A | * | 9/1998 | Hilland | 703/25 |
| 5,922,062 A | * | 7/1999 | Evoy | 710/305 |
| 6,006,295 A | | 12/1999 | Jones et al. | |
| 6,073,201 A | * | 6/2000 | Jolley et al. | 710/315 |
| 6,154,810 A | * | 11/2000 | Derby et al. | 711/113 |
| 6,209,023 B1 | | 3/2001 | Dimitroff et al. | |
| 6,338,139 B1 | | 1/2002 | Ando et al. | |
| 6,553,433 B1 | | 4/2003 | Chang | |
| 6,553,440 B1 | | 4/2003 | Ikegaya | |
| 2001/0003197 A1 | | 6/2001 | Matsushima et al. | |
| 2002/0062387 A1 | * | 5/2002 | Yatziv | 709/236 |
| 2002/0078276 A1 | | 6/2002 | Hung | |

FOREIGN PATENT DOCUMENTS

| | | | | |
|---|---|---|---|---|
| JP | 11345195 | * | 12/1999 | G06F/13/36 |
| JP | 2001100990 | * | 4/2001 | G06F/9/06 |
| JP | 2001306327 | * | 11/2001 | G06F/9/445 |

OTHER PUBLICATIONS

ARS–2000IW User's Manual, ACARD Technology Corp. Ver. 1.0, Copyright 2000.*
Arena 99EX SCSI to IDE Disk Array System, User's Guide, Version 5.11, May 2000.*

* cited by examiner

*Primary Examiner*—Fritz M Fleming
(74) *Attorney, Agent, or Firm*—Duft, Setter, Ollila & Bornsen, LLC (57) ABSTRACT

Methods and associated structure operable within a SCSI-based storage subsystem are provided to adapt the storage controller for use with non-SCSI storage enclosures. A firmware layer of the present invention intercepts SCSI read/write requests and pass-through command blocks (CDBs) generated by the storage management core of the controller and translates the requests and command structures into corresponding command structures for transmission to a non-SCSI storage enclosure. In like manner, the firmware layer of the present invention receives status information from non-SCSI storage enclosures and translates the status information into corresponding SCSI compatible status information. In one exemplary preferred embodiment, a storage subsystem designed for interaction with SCSI storage enclosures may be adapted in accordance with the present invention to utilize lower-cost, IDE compatible storage enclosures.

13 Claims, 3 Drawing Sheets

METHODS AND STRUCTURE FOR SCSI/IDE TRANSLATION FOR NON-SCSI ENCLOSURES IN A STORAGE SUBSYSTEM

BACKGROUND OF THE INVENTION

1. Field on the Invention

The invention relates to storage subsystem control methods and structures and more specifically relates to methods and structures for utilizing non-SCSI enclosure backplane devices in a storage subsystem designed for SCSI interfacing.

2. Related Patents

The patent application is related to co-pending, commonly owned U.S. patent application Ser. No. 10/207,672, entitled METHODS AND STRUCTURE FOR SCSI/IDE TRANSLATION IN A STORAGE SUBSYSTEM, filed Jul. 29, 2002 which is hereby incorporated by reference and is referred to herein as the "related patent."

3. Discussion of Related Art

High-capacity, high-performance storage subsystems often utilize a plurality of disk drives to achieve redundancy for enhanced reliability and to achieve performance improvements. Reliability is enhanced by creating redundancy information to be stored in the storage subsystem in addition to the user or host supplied data. Further, the user data and redundancy information may be distributed over multiple disk drives so that failure of any single disk drive will not cause loss of data or prevent continued utilization of the storage subsystem. In addition, performance of a storage subsystem may be enhanced by distributing stored data (user and/or redundancy data) over multiple disk drives so that I/O requests may be processed by multiple disk drives in parallel rather than waiting for operations to complete on a single disk drive.

Often, such storage subsystems utilizing multiple disk drives are designed to utilize SCSI interface disk drives. The SCSI interface (small computer system interface) disk drives often provide higher performance as compared to lower-cost, commodity disk drives. High-performance subsystems therefore often utilize such higher performance SCSI disk drives. The SCSI standard is well documented and readily available in printed or electronic form from numerous source. For example, one version of the SCSI standards may be found at: http://www.micro-magic.comlftplscsi2.pdf. Numerous older and updated versions may be readily located by those of ordinary skill in the art. As used here, "SCSI" refers to any and all present, future and past versions of the SCSI specifications. The problems addressed herein and the solutions provided by the present invention are applicable to systems using disk drives compliant with any and all versions of the SCSI standard specifications.

One common type of storage subsystem is referred to as a RAID storage subsystem (redundant array of independent drives). Such a RAID storage subsystem typically includes one or more storage controllers to provide processing functionality for receiving and processing host system supplied I/O requests and for managing lower-level manipulation of information stored on and retrieved from a plurality of disk drives associated with the subsystem. The storage controller performs required management and processing to effectuate the RAID storage management techniques. In particular, a RAID storage controller manages generation, storage and retrieval of redundancy information and associated host supplied data and also manages the distribution (striping) of data over the multiple disk drives.

In view of the traditional preference for high performance SCSI disk drives, many RAID storage controllers are designed and programmed in a manner optimized for utilization of such high-performance SCSI disk drives. The SCSI interface standards describe command structures and associated data structures useful in interacting with SCSI disk drives and other SCSI devices. SCSI oriented RAID storage controllers therefore are designed to expect and utilize such structures and command interfaces. The control processes (i.e., firmware) operable within typical RAID controllers designed for SCSI disk drives therefore are typically designed assuming use of standard SCSI commands and status as well as standard data structures used for interacting with such SCSI disk drives.

Non-SCSI disk drives such as IDE interface disk drives have advanced substantially in performance and remain substantially less expensive than higher performance SCSI disk drives. The related application discusses methods and structures for translating between SCSI and IDE for status information exchange and for command sequence exchange. This allows existing RAID controller architectures to be easily ported to systems using less expensive IDE disk drives without requiring significant re-design of the RAID control structures and processes.

TO further enhance ease of use and reliability of a storage subsystem, disk drives are often physically mounted in enclosures (i.e., cabinets) designed for ease of replacement of disk drives (i.e., so called "hot swap" of failed disk drives without requiring stoppage of the entire subsystem). Typically in such enclosures, disk drives are adapted to plug ("hot plug") into a backplane configured to accept a plurality of such disk drives. All power, data and control signals associated with the disk drives are routed through the backplane. Thus, removal or insertion of a disk drive is a simpler process. It is slid into a backplane slot or slid out of a backplane slot.

In addition, such enclosures often include enhanced reliability features. A storage subsystem may fail due to reasons other than failure of a disk drive, per se. A storage subsystem includes power supplies for powering the disk drives in the subsystem, fans for cooling the disk drives and the entire subsystem, etc. Enclosures therefore often include redundant power supplies and fans so that failure of a single power supply of fan, like failure of a single disk drive, will not disable all operation of the subsystem. Power supplies and fans are also adapted for easy, "hot" insertion and removal to replace failed components. Redundant temperature sensors are often integrated into such enclosures to sense environmental conditions outside of specification that may lead to future failures.

These enclosures, backplanes and other redundant components are also designed to communicate with controller components (i.e., RAID controllers) using SCSI standards for exchange of information (i.e., sensing drive presence/absence, temperature, power and other environmental aspects of the enclosure and its contents). The SCSI "SAF-TE" standard and the SCSI Enclosure Standard ("SES") are two specifications in the family of SCSI standards that provide standardized specifications for communications with such enclosures and the various components within the enclosure. These standards address communications with features of the enclosure other than the exchange of data stored on the disk drives.

As IDE disk drives have evolved, so too has a new line of commercial products for enclosures based on lower-cost IDE disk drives. Backplanes for such enclosures are rapidly evolving that utilize IDE standards for disk drive interfacing. Power supplies, fan components, sensors of various types are designed in conjunction with such IDE backplanes and utilize IDE-like command structures for exchange of environmental information with a controller (i.e., RAID controller).

It is evident from the above discussion that a need exists for methods and associated structure to simplify adaptation of a storage controller for utilization of a variety of enclosures and communication with components within such enclosures.

SUMMARY OF THE INVENTION

The present invention solves the above and other problems, thereby advancing the state of useful arts, by providing methods and associated structure for easily converting between SCSI command/status interfaces and non-SCSI command/status interfaces to enable direct operation of non-SCSI enclosures and components by a storage controller designed for SCSI enclosure interfacing. In particular, features of the present invention enable communication between a SCSI-oriented storage controller (i.e., RAID controller) and non-SCSI enclosure and backplane devices. SCSI commands are converted to corresponding sequences of non-SCSI commands and non-SCSI status information is converted to equivalent SCSI status information to enable control of, and return of information from, non-SCSI enclosures. More specifically, the present invention provides a firmware layer that intercepts SCSI command blocks directed toward an enclosure or a component within the enclosure and converts the intercepted command structures and directives into appropriate command directives and structures for desired non-SCSI enclosure components. In like manner, the firmware layer of the present invention intercepts returned status information from non-SCSI enclosures and converts the non-SCSI status information into corresponding SCSI compatible status information for return to higher layers of the SCSI-based storage controller expecting SCSI SAF-TE or SES standards for communication with enclosures.

Still more specifically, in one exemplary preferred embodiment, SCSI command blocks are intercepted and converted to corresponding IDE command structures. Further, IDE status information may be received by a firmware layer of the present invention and converted to corresponding SCSI status information for return to higher layers of the storage controller.

A first feature of the invention provides a storage subsystem comprising: a storage controller adapted for controlling SCSI storage enclosures; a non-SCSI storage enclosure; and a conversion element coupling the storage controller to the storage enclosure for converting information exchanged between the storage controller and the non-SCSI storage enclosure.

Another aspect of the invention further provides that the conversion element includes: a pass-through SCSI CDB conversion element to convert pass-through SCSI commands for application to the non-SCSI storage enclosure.

Another aspect of the invention further provides that the conversion element includes: a read/write SCSI message conversion element to convert read and write SCSI requests for application to the non-SCSI storage enclosure.

Another aspect of the invention further provides that the conversion element includes: a status conversion element for receiving status information from the non-SCSI storage enclosure and converting the status information to related SCSI status information.

Another aspect of the invention further provides that the non-SCSI storage enclosure is an IDE compliant storage enclosure.

Another aspect of the invention further provides that the storage controller is a RAID storage controller. Another feature of the invention provides a system comprising: a non-SCSI storage enclosure; and a SCSI-based storage controller communicatively coupled to the non-SCSI storage enclosure such that the SCSI-based controller includes: storage management core means for managing the non-SCSI storage enclosure; and SCSI command conversion means for converting SCSI commands generated by the storage management core means for application to the non-SCSI storage enclosure.

Another feature of the invention provides a method operable within a storage controller comprising the steps of: generating SCSI commands to manipulate a non-SCSI storage enclosure associated with the storage controller; converting the SCSI commands to non-SCSI commands; and applying the non-SCSI commands to the non-SCSI storage enclosure.

Another aspect of the invention further provides the step of: providing a mapping table such that entries of the table maps a corresponding SCSI command to a conversion function for generating the non-SCSI commands, such that the step of converting the SCSI commands comprises: looking up the SCSI command in the mapping table to identify the corresponding conversion function; and invoking the corresponding conversion function to generate the non-SCSI commands.

Another aspect of the invention further provides the steps of: receiving non-SCSI status information from the non-SCSI storage enclosure; converting the non-SCSI status information to SCSI status information; and applying the SCSI status information to storage management elements operable within the storage controller.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
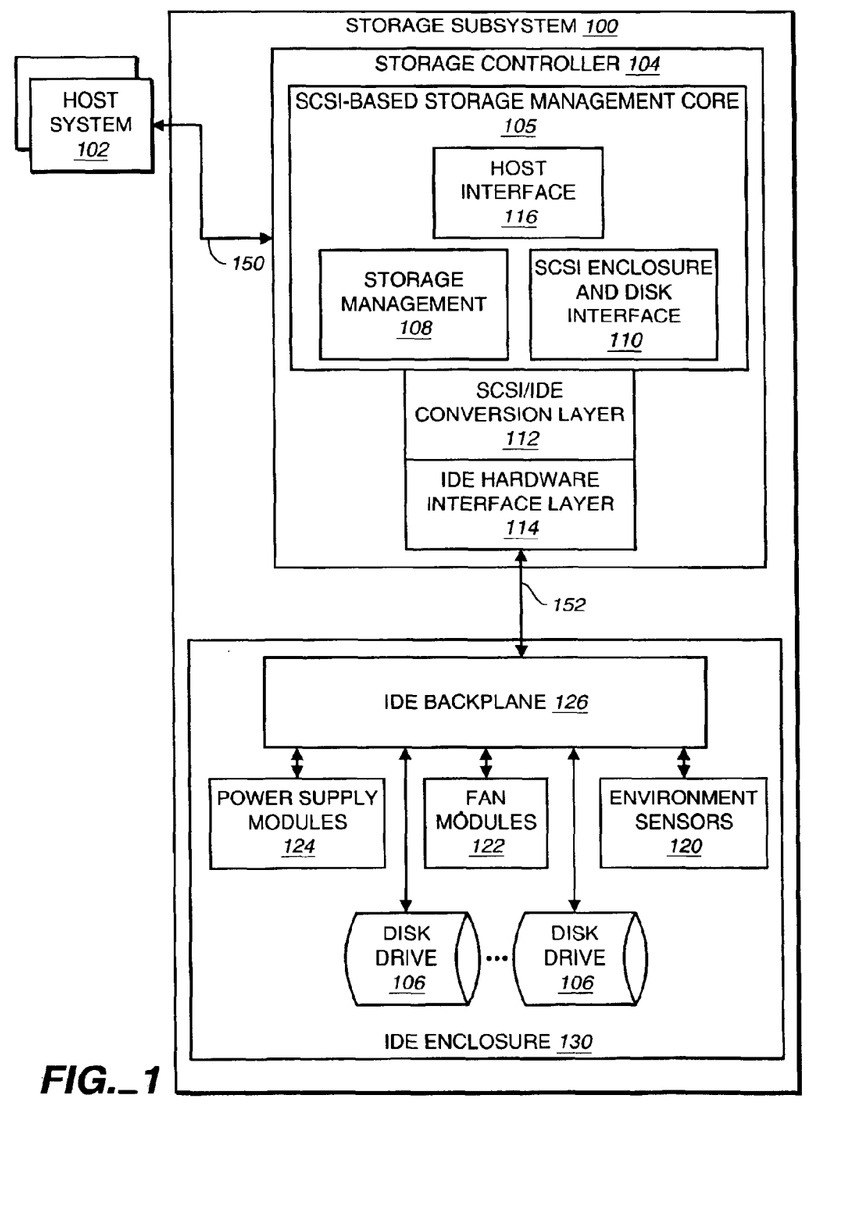
FIG. 1 is a block diagram of a system including a SCSI-based storage controller adapted to convert between SCSI and non-SCSI command and status interfacing.

FIG. 1 is a block diagram of a storage subsystem 100 adapted in accordance with the present intention to convert SCSI command and status information exchange for interfacing with non-SCSI storage enclosure 130. SCSI-based storage controller 104 may be designed for SCSI interfacing with storage devices. The features of the present invention allow for such an existing SCSI-based design to be easily adapted for use with non-SCSI storage enclosures.

Non-SCSI storage enclosure 130 may include a backplane 126 into which components within the enclosure are mechanically and electronically coupled. Disk drives 106 are coupled to backplane 126 to provide storage of data and associated RAID redundancy information where RAID techniques are applied to management of the stored data. In addition, power supply modules 124, fan modules 122 and environment sensors 120 (i.e., temperature and other sensors) may be coupled physically and electronically to backplane 126. Backplane 126, in turn, exchanges signals over bus 152 with a hardware interface layer 114 of the storage management core 105. As shown in FIG. 1, enclosure 130 is an IDE enclosure with IDE disk drives 106. IDE power supply modules 124, IDE fan modules 122 and IDE sensors 120 all coupled to IDE backplane 126. It will readily apparent to those of ordinary skill in the art that any non-SCSI interface and associated compliment of devices in an enclosure may be utilized in conjunction with the architecture of the present invention. IDE/SCSI conversion is therefore intended as one exemplary application of the features and architecture of the present invention.

SCSI-based storage management core 105 may preferably include a host interface element 116 for managing interaction with host systems 102 via path 150. Path 150 may be any of several well known communication media used for coupling a host system to a storage subsystem including for example parallel SCSI, local area networks, Fibre Channel, etc. Host interface element 16 may preferably receive I/O requests from a host system 102 coupled to storage subsystem 100 via path 150 and forwards any required response or status information back to the requesting host system 102.

SCSI-based storage management core 105 may also preferably include a storage management element 108 generally responsible for higher level storage management functions within storage controller 104 of storage subsystem 100. For example, storage management element 108 may provide desired processing for RAID storage management techniques applied within storage controller 104. Such RAID storage management techniques may include, as known in the art, redundancy information generation and checking as well as distribution or striping of data and redundancy information over a plurality of disk drives. Those of ordinary skill in the art will readily recognize that RAID storage management is merely exemplary of one form of storage management common within high-performance, high reliability storage subsystems. Other storage management techniques may be applied within SCSI-based storage management core 105 within the spirit and scope of the present invention.

SCSI-based storage management core 105 also may preferably include SCSI enclosure and disk interface element 110 for providing lower level control and access to SCSI compliant devices such as SCSI enclosures and disk drives.

Storage controller 104 is adapted in accordance with the present invention to permit translation and conversion of information exchanged between the storage controller 104 and non-SCSI storage enclosure 130. In particular, SCSI/IDE conversion layer 112 adapts commands and status normally exchanged between SCSI disk interface 110 and appropriately configured SCSI storage enclosures to permit utilization of lower-cost, commodity non-SCSI storage enclosures 130. Exemplary of such lower-cost commodity storage enclosures are enclosures using IDE interfacing and/or IDE backplanes and related variants of IDE interface techniques.

SCSI commands may be generated by elements within SCSI-based storage management core 105 and are communicated to SCSI/IDE conversion layer 112. Following conversion from SCSI to non-SCSI command sequence structures, the generated, converted command structures are then applied in accordance with known techniques to the non-SCSI storage enclosure 130 via non-SCSI (i.e., IDE) hardware interface layer 114. In like manner, status information returned from enclosure 130 is converted within conversion layer 112 back into a form and semantic consistent with SCSI specifications. In one exemplary preferred embodiment conversion layer 112 provides conversion between SCSI and non-SCSI command and status exchanges in a manner transparent to SCSI-based storage management core 105. In this manner, the present invention simplifies the process of converting an existing SCSI-based storage management architecture to permit utilization of lower-cost non-SCSI storage enclosures. SCSI-based storage management core 105 may be left substantially unchanged where conversion layer 112 transparently provides requisite conversion between syntax, structure and semantic interpretation of various command and status information exchanges. In particular, aspect of SCSI-based storage management core 105 related to enclosure management in accord with either the SCSI SAF-TE or SES standards need not be modified to enable use of lower-cost commodity non-SCSI enclosures.

Storage management core 105 may therefore communicate with the enclosure 130 as a device or any of the components within enclosure 130. The term "non-SCSI device" or "IDE device" shall mean the non-SCSI enclosure 130 and/or any of the components within the enclosure.

In one exemplary preferred embodiment, enclosure 130 is IDE compliant. Path 152 therefore may represent an IDE interface signal path exchanging signals between IDE hardware interface layer 114 and IDE backplane 126 within enclosure 130. IDE hardware interface layer 114 exchanges IDE compliant signals over past 152 to forward IDE commands supplied by conversion layer 112 to enclosure 130 (and components therein) and to retrieve IDE status from enclosure 130 (and components therein). In this exemplary preferred embodiment, SCSI-based storage management core 105 is adapted by use of conversion layer 112 to permit utilization of lower-cost, commodity IDE enclosures in an otherwise SCSI-based storage subsystem architecture.

Figure 2:
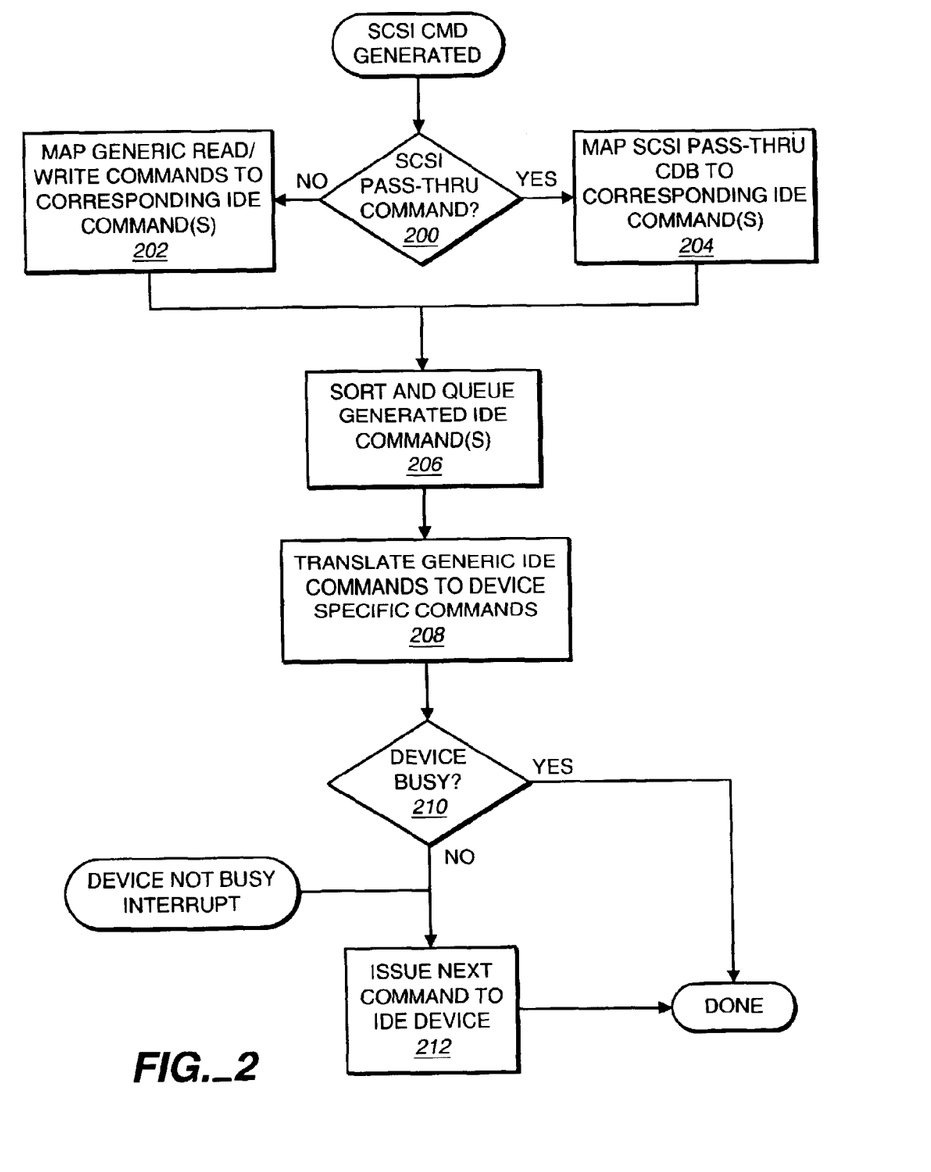
FIG. 2 is a flowchart describing a method of the present invention for converting SCSI commands to non-SCSI commands for application to a non-SCSI storage enclosure.

FIG. 2 is a flowchart describing a method of the present invention whereby SCSI command structures generated by a SCSI-based storage management core structure within the storage controller are intercepted by the conversion process and converted into non-SCSI (i.e., IDE) command structures. Upon receipt of a generated SCSI command, element 200 is first operable to determine whether the received SCSI command structure represents a typical, generic read/write operation or whether the received SCSI command structure represents a SCSI pass-through command structure. In general, most storage subsystems utilize generic SCSI read and write commands to perform desired transfer of data between the storage controller and a non-SCSI device. Numerous other SCSI commands may be utilized to provide special-purpose data transfers or other status and control functions in exchanges between the non-SCSI device and the storage controller. Often these other commands are referred to as "pass-through" SCSI commands in that lower level specific sequences of SCSI commands may be constructed by the storage controller to effectuate a particular control or status information exchange. By contrast, typical, generic read/write operations may be specified as higher level SCSI command structures.

If element 200 determines that the intercepted SCSI command represents a SCSI pass-through command structure, element 204 is operable to map the specified SCSI pass-through command to corresponding sequences of one or more IDE (or other non-SCSI) command sequences. Processing then continues at element 206. If element 200 determines that the received SCSI command represents a generic read/write operation, element 202 is, instead operable to map the intercepted generic read/write request into corresponding sequences of one or more IDE (nor-SCSI) command sequences. Processing then continues with element 206 below.

The mapping process performed by elements 202 and 204 may be implemented using any of numerous equivalent programmable software or hardware constructs in accordance with the present invention. For example, a table structure may be utilized indexed by a particular SCSI command value to access a data structure containing corresponding IDE commands. Or, for example, the entry in such a table may contain a pointer to a function used to generate corresponding sequences of IDE commands to perform the corresponding SCSI command. Those of ordinary skill in the art will recognize a variety of equivalent structures and techniques for mapping from a received SCSI command directive to corresponding sequences of one or more non-SCSI (i.e., IDE) command sequences.

Those of ordinary skill in the art will recognize that all SCSI operations may be specified in any format such that elements 200–204 need not select among different command structures (i.e., generic readlwrite operations as distinct from pass-through structures). Or, additional specific formats may be specified for certain implementation features. More broadly, in accordance with the present invention, any received SCSI request may be converted to non-SCSI equivalent operations in accordance with any selected SCSI command/messaging format. Such design choices are well known to those of ordinary skill in the art and are within the scope of the present invention.

Element 206 is then operable to sort and queue IDE commands generated by operation of either of elements 202 and 204 described above. In an exemplary preferred embodiment, the conversion layer of the present invention maintains a queue of commands to be applied to each of a plurality of non-SCSI devices associated with the storage subsystem. Commands generated to be applied to a particular non-SCSI device are added to the corresponding queue for that device. Further, processing of element 206 may analyze the queue of commands and combine sequences of consecutive smaller read or write commands into a single larger I/O request to the corresponding non-SCSI device. Such aggregation of smaller command operations provides further performance enhancement in operation of the non-SCSI device.

Element 208 is next operable to translate the generic IDE commands queued for a non-SCSI device into specific IDE commands that may be issued for the specific device based on features and configuration parameters of the specific device. For example, where the non-SCSI devices are IDE compliant non-SCSI devices, read and write commands may be mapped to corresponding UDMA, MDMA or PIO read/write command structures according to the supported modes of the specific IDE devices.

Element 210 determines if the specified non-SCSI device is presently busy processing a command previously applied to the device. If not, processing continues with element 212 to apply the next command presently queued for the device to the appropriate, specified non-SCSI device thereby completing processing of the method of FIG. 2. If element 210 determines that the specified non-SCSI device is presently busy processing another non-SCSI command sequences, the method completes and the newly queued commands remain queued for later processing as discussed further hearing below. In general, an interrupt or other status detected from the specific non-SCSI device will generate appropriate status information to be directed back to be storage management core structure and will also trigger a determination that the next queued command may be initiated and applied to the non-SCSI device.

Figure 3:
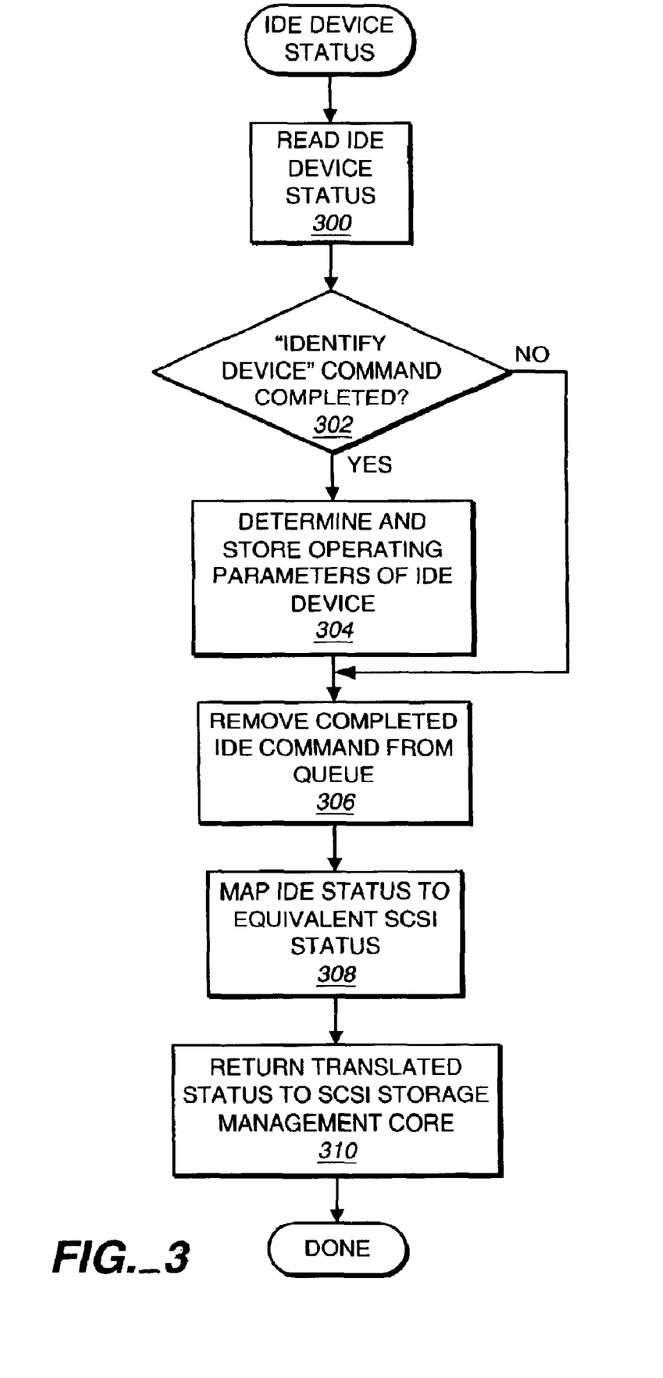
FIG. 3 is a flowchart describing a method of the present invention for converting status information from non-SCSI storage enclosures into SCSI compliant equivalent status information.

FIG. 3 is a flowchart of a process of the present invention such that a non-SCSI device interrupts the system to report completion status for a previously applied non-SCSI command. Often such status is reported using interrupt features of the non-SCSI interface bus. For example, an IDE device utilizes the IDE interface to provide an interrupt indicating that the previously applied command has been completed. Upon receipt of such a status message or interrupt, element 300 is first operable to read any required device status information from the interrupting device representing completion status of a previously applied command.

During initialization of a storage subsystem (SCSI or non-SCSI) most controllers utilize the storage devices in the simplest modes available. Numerous options and features are often present in the storage devices but these features are unknown to the storage controller until after initialization of the storage devices. In SCSI-based systems, the controller usually issues a SCSI "Inquiry" command to request information about each SCSI device. Upon return of corresponding information, the subsystem may utilize various performance features available on the individual SCSI devices.

In accordance with the present invention, a SCSI Inquiry command may be translated to an IDE "Identify Device" to request information about the IDE devices (i.e., modes supported by the device and features supported). The information returned by the Identify Device IDE command may be analyzed by the conversion layer of the present invention to identify useful features and parameters for operating the corresponding IDE device.

Element 302 therefore determines if the completed command that corresponds to the received completion status is an "Identify Device" IDE command. If so, element 304 is operable to decode relevant parameters from the returned device information and store various parameters for later utilization as noted above. In either case, element 306 is next operable to remove the just completed non-SCSI command from the queue maintained for the corresponding non-SCSI device. As noted above, element 306 may also include processing to initiate a next queued command retrieved from the queue corresponding to the specific interrupting IDE device.

Element 308 is next operable to map the decoded IDE status to equivalent SCSI compliant status information. As above with regard to FIG. 2, the step of mapping may be implemented in numerous equivalent manners readily recognized by those of ordinary skill in the art. In one exemplary preferred embodiment, a table structure may be used to map received IDE (non-SCSI) status information into corresponding SCSI status data. Further, as noted above, an alternative embodiment may provide for a mapping table that maps the received IDE status into a corresponding pointer to a function invoked to generate corresponding SCSI status information. Element 310 is then operable to return back to the SCSI storage management elements of the storage controller the SCSI status information derived from the received non-SCSI (IDE) status information.

Those of ordinary skill in the art will readily recognize that the methods described in FIGS. 2 and 3 are exemplary of numerous equivalent techniques well-known to those of ordinary skill in the art for translating one form of command and status information to another. The methods of FIGS. 2 and 3 are therefore intended broadly to represent all such methods for translating between SCSI and non-SCSI formats for command and status information exchange between a SCSI-based storage controller and non-SCSI devices coupled thereto.

In addition, those of ordinary skill in the art will readily recognize that a storage controller as used herein may be implemented as a stand-alone device within a self-contained storage subsystem whereby host systems couple through the storage controller to the storage subsystem via any of several well-known peripheral interface connections. In addition, a storage controller adapted in accordance with the present invention may also be implemented as programmed instructions within a host system such as a workstation or personal computer. The present invention is intended to broadly cover all such implementations of storage controllers such that a SCSI-based storage controller design may be quickly, easily, and inexpensively adapted for utilization of lower-cost non-SCSI devices such as IDE enclosures and IDE disk drives.

The following code sequences represent exemplary data structures that may be utilized in an exemplary embodiment of the present invention. Those of ordinary skill in the art will recognize the data structures below as exemplary of typical structures that may be utilized to represent such an interface and device. Numerous equivalent structures will be readily apparent to those of ordinary skill in the art.

```
/*
 *  Define back plane device structure.
 */
typedef struct _SAFTE_INFO {
    uchar   saftePresent;                  /* set TRUE when the SAF-TE
device is emulated */
    uchar   deviceMonitored[IDE_MAX_DEVICES_PER_INTERFACE];      /*
TRUE if this device is being monitored */
    uchar   pad0[1];
    /*
     * SCSI data goes here
     */
    struct {                               /* INQUIRY data for SAF-TE devices */
        SCSI_INQUIRY_SAFTE std;            /* standard simulated
inquiry data for this device */
        struct   {                         /* SAF-TE extensions to INQUIRY */
            uchar     enclId[7];           /* unique identifier ID
number (we'll use S/N) */
            uchar     channel;             /* channel identifier */
            uchar     idStr[6];            /* SAF-TE ID string */
            uchar     rev[4];              /* SAF-TE revision */
            uchar     resv[2];             /* reserved */
        } safte;
    } inqData;
    struct   {
        uchar   unitAttnPending;           /* TRUE when unit attention
is pending */
        uchar   pad0[1];
        struct   {                         /* pending sense data */
            uchar     sense;
            uchar     asense;
            uchar     ascq;
            uchar     sksv;
            ushort    fieldPtr;
        } sense;
    } scsi;
    /*
     * declare SAF-TE buffers and status info
     */
    uchar   alarmActive;                   /* TRUE when alarm is active
*/
    uchar   pad1[3];
    ushort  deviceInsertions[IDE_MAX_DEVICES_PER_INTERFACE];
    uchar   deviceSlotStatus[IDE_MAX_DEVICES_PER_INTERFACE] [4];
    uint    deviceInsertedTime[IDE_MAX_DEVICES_PER_INTERFACE];   /*
The time when a new drive is inserted */
} SAFTE_INFO;
/*
 *  Define SCSI SAF-TE device structure.
 */
typedef struct _SCSI_INQUIRY_SAFTE {
    uint    peripheralDeviceType   : 5;    /* byte 0 */
    uint    peripheralQualifier    : 3;
    uint    reserved1              : 7;    /* byte 1 */
    uint    rmb                    : 1;
    uint    ansiVersion            : 3;    /* byte 2 */
```

-continued

```
    uint        ecmaVersion           : 3;
    uint        isoIecVersion         : 2;
    uint        responseDataFormat    : 4;   /* byte 3 */
    uint        reserved2             : 1;
    uint        normAca               : 1;
    uint        trmTsk                : 1;
    uint        aerc                  : 1;
    uchar       additionalLength;           /* byte 4 */
    uchar       reserved3;                  /* byte 5 */
    uint        addr16                : 1;  /* byte 6 */
    uint        addr32                : 1;
    uint        ackReqQ               : 1;
    uint        mChngr                : 1;
    uint        multiP                : 1;
    uint        vs1                   : 1;
    uint        encServ               : 1;
    uint        reserved4             : 1;
    uint        vs2                   : 1;  /* byte 7 */
    uint        cmdQue                : 1;
    uint        tranDis               : 1;
    uint        linked                : 1;
    uint        sync                  : 1;
    uint        wBus16                : 1;
    uint        wBus32                : 1;
    uint        relAdr                : 1;
    char        vendorIdentification[8];    /* byte 8 */
    char        productIdentification[16];  /* byte 16 */
    char        productRevisionLevel[4];    /* byte 32 */
} SCSI_INQUIRY_SAFTE;
```

The following code segments (function prototypes, etc.) represent typical functions that may be used to effectuate desired mapping of SCSI nclosure related command structures into corresponding sequences of equivalent IDE commands for non-SCSI storage enclosure components. Those of ordinary skill in the art will recognize a variety of equivalent functions and structures that may be used to effectuate the mapping from a SCSI enclosure related command to equivalent IDE sequences of commands for non-SCSI storage enclosures.

```
/*
 * define SCSI CDB function prototypes
 */
            void        IdeDcdbSafteInit(void);
            void        IdeDcdbSafte(IdeCmd *ic, int calledFromIdeCmdFree);
            void        printSafteStruct(uint index);
    static  void        inquiry(IdeCmd *ic);
    static  void        readBuffer(IdeCmd *ic);
    static  void        requestSense(IdeCmd *ic);
    static  void        sendDiagnostic(IdeCmd *ic);
    static  void        testUnitReady(IdeCmd *ic);
    static  void        writeBuffer(IdeCmd *ic);
/*
 * define internal function prototypes to access/process back plane
devices/results.
 */
    static  void        safteInitCallback(IdeCmd *ic, uint status);
    static  void        readDeviceSlotStatusNext(IdeCmd *ic);
    static  void        readDeviceSlotStatusCallback(IdeCmd *ic, uint
status);
    static  void        writeDeviceSlotStatusNext(IdeCmd *ic);
    static  void        writeDeviceSlotStatusCallback(IdeCmd *ic, uint
status);
    static  void        performSlotOperationCallback(IdeCmd *ic, uint
status);
/*****************************************************************
*** *
 * IdeDcdbSafte function
 *
 * This function will process the given SAF-TE DCDB command. If the
device ID
 * is invalid, then the command is rejected.
 */
    void        IdeDcdbSafte(IdeCmd *ic, int calledFromIdeCmdFree)
    {
        RAID_DEVICE_MSG     *msg = ic->msg;
```

-continued

```
    uchar            *cdb = (uchar *)RDM_DCB_ADDR(msg);
    SAFTE_INFO       *si = &safteInfo[RDM_CHN(msg)];
    /*
     * validate the device ID
     */
    if (RDM_TGT(msg) != AMI_BACKPLANE_ID    ||    !si->saftePresent) }
        IdeCmdFree(ic);
        IdeMsgComplete(msg, SEL_TO);      /* treat bad devices like
select timeout */
        return;
    }
    /*
     * do some message initialization
     */
    RDM_SET_DCDB_SNSLEN(msg, 0);          /* clear the sense length
flag */
    RDM_RESET_DCDB_SNSFLAG(msg);          /* clear the request
sense flag */
    /*
     * print the CDB if debugging enabled
     */
    if (IdeDebugFlags & IDE_DEBUG_PRINT_DCDB) {
        uint       i;
        IdeDebugPrintf("IdeDcdbSafte: ic=%x,msg=%x, cdb =", ic, msg);
        for (i=0; i<RDM_DCDB_CDBLEN(msg); i++)
            IdeDebugPrintf(" %02x", cdb[i]);
        IdeDebugPrintf("\n");
    }
    /*
     * make sure this LUN is supported - we only support LUN 0
     */
    if ((cdb[1]& 0xE0) !=0) {
        IdeDcdbSenseSet(ic, SN_ILLEGAL_REQUEST,
SA_LOGICAL_UNIT_NOT_SUPPORTED, 0);
        IdeDcdbDone(ic, SS_CHECK);
        return;
    }
    /*
     * if this is not an inquiry or request sense command, then we
must do some
     * common validation
     */
    if (cdb[0] != SC_INQUIRY && cdb[0] != SC_REQUEST_SENSE) {
        /*
         * make sure this LUN is supported - we only support LUN 0
         */
        if (RDM_LUN(msg) != 0) {
            IdeDcdbSenseSet(ic, SN_ILLEGAL_REQUEST,
SA_LOGICAL_UNIT_NOT_SUPPORTED, 0);
            IdeDcdbDone(ic, SS_CHECK);
            return;
        }
        /*
         * check for and handle UNIT ATTENTION conditions
         */
        if (si->scsi.unitAttnPending) {
            si->scsi.unitAttnPending = FALSE;
            IdeDcdbSenseSet(ic, SN_UNIT_ATTENTION,
SA_POWER_OR_RESET_OCCURED, 0);
            IdeDcdbDone(ic, SS_CHECK);
            return;
        }
        /*
         * reset any old sense data not already read
         */
        IdeDcdbSenseSet(ic, SN_NO_SENSE, SA_NO_SENSE, 0);
    }
    /*
     * call the proper function for CDB processing
     */
    if (cdb[0]) == SC_TEST_UNIT_READY)
        IdeDcdbDone(ic, SS_GOOD);         /* TUR is always
successful for emulated SAF-TE devices */
    else if (cdb[0] == SC_REQUEST_SENSE)
        requestSense(ic);
    else if (cdb[0] == SC_INQUIRY)
        inquiry(ic);
    else if (cdb[0] == SC_SEND_DIAGNOSTIC)
        IdeDcdbDone(ic, SS_GOOD);         /* SEND DIAG is always
```

-continued

```
successful for emulated SAF-TE devices */
    else if (cdb[0] == SC_READ_BUFFER)
        readBuffer(ic);
    else if (cdb[0] == SC_WRITE_BUFFER)
        writeBuffer(ic);
    else {
        IdeDcdbSenseSet(ic, SN_ILLEGAL_REQUEST,
SA_INVALID_COMMAND_OPCODE, 0);
        IdeDcdbDone(ic, SS_CHECK);          /* terminate this
command      */
    }
    return;
}
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A storage subsystem comprising:
a storage controller adapted for exchanging information with SCSI storage enclosures using SAF-TE and/or SES standards for information exchanges with SCSI storage enclosures;
a non-SCSI storage enclosure wherein the non-SCSI storage enclosure is adapted to exchange information with a non-SCSI storage controller and wherein the non-SCSI storage enclosure does not operate in compliance with SAF-TE or SES standards; and
a conversion element coupling said storage controller to said non-SCSI storage enclosure for converting information exchanged between said storage controller and said non-SCSI storage enclosure wherein the converted information exchanges include exchanges in accordance with SAF-TE and/or SES standards and wherein the conversion element further comprises suitably programmed instructions and associated data executed by a processor within the storage controller.

2. The subsystem of claim 1 wherein said conversion element includes:
a pass-through SCSI CDB conversion element to convert pass-through SCSI commands for application to said non-SCSI storage enclosure.

3. The subsystem of claim 1 wherein said conversion element includes:
a read/write SCSI message conversion element to convert read and write SCSI requests for application to said non-SCSI storage enclosure.

4. The subsystem of claim 1 wherein said conversion element includes:
a status conversion element for receiving status information from said non-SCSI storage enclosure and converting said status information to related SCSI status information.

5. The subsystem of claim 1 wherein said non-SCSI storage enclosure is an IDE compliant storage enclosure.

6. The subsystem of claim 1 wherein said storage controller is a RAID storage controller.

7. A system comprising:
a non-SCSI storage enclosure wherein the non-SCSI storage enclosure is adapted to exchange information with a non-SCSI storage controller and wherein the non-SCSI storage enclosure does not operate in compliance with SAF-TE or SES standards; and
a SCSI-based storage controller communicatively coupled to said non-SCSI storage enclosure wherein said SCSI-based controller includes:
storage management core means for exchanging information with a SCSI storage enclosure in compliance with SAF-TE and/or SES standards; and
SCSI command conversion means for converting SCSI commands generated by said storage management core means for application to said non-SCSI storage enclosure.

8. The system of claim 7 said SCSI command conversion means comprises:
command mapping means for mapping each SCSI command to a corresponding sequence of one or more IDE commands.

9. The system of claim 7 wherein said controller further comprises:
SCSI status conversion means for receiving status information from said non-SCSI storage enclosure and for converting said status information to equivalent SCSI status information and for applying said equivalent SCSI status to said storage management core means.

10. The system of claim 9 wherein said SCSI status conversion means comprises:
means for receiving IDE status information from said non-SCSI storage enclosure; and
status mapping means for mapping said IDE status information to a corresponding sequence of one or more SCSI status messages.

11. A method operable within a SCSI storage controller comprising the steps of:
generating SCSI commands in compliance with SAF-TE and/or SES standards to manipulate a non-SCSI storage enclosure associated with said storage controller wherein the non-SCSI storage enclosure is adapted to exchange information with a non-SCSI storage controller and wherein the non-SCSI storage enclosure does not operate in compliance with SAF-TE or SES standards;
converting said SCSI commands to non-SCSI commands; and
applying said non-SCSI commands to said non-SCSI storage enclosure.

12. The method of claim 11 further comprising the step of:
providing a mapping table wherein entries of the table maps a corresponding SCSI command to a conversion function for generating said non-SCSI commands, wherein the step of converting said SCSI commands comprises:

looking up said SCSI command in said mapping table to identify the corresponding conversion function; and invoking said corresponding conversion function to generate said non-SCSI commands.

13. The method of claim 11 further comprising the steps of:

receiving non-SCSI status information from said non-SCSI storage enclosure;

converting said non-SCSI status information to SCSI status information; and applying said SCSI status information to storage management elements operable within said storage controller.

* * * * *